United States Patent [19]

Herring

[11] Patent Number: 4,679,365
[45] Date of Patent: Jul. 14, 1987

[54] EMERGENCY EXIT FOR A PERSONNEL CHAMBER

[76] Inventor: Charles Herring, Rte. 3, Greenville, Ill. 62246

[21] Appl. No.: 779,961

[22] Filed: Sep. 25, 1985

[51] Int. Cl.[4] ............... E05B 65/10; E06B 1/04
[52] U.S. Cl. ........................... 52/204; 52/69; 49/141; 49/465
[58] Field of Search ............... 52/19, 127.1, 127.6, 52/127.8, 196, 202, 204, 69, 1; 49/141, 57, 465

[56] References Cited

U.S. PATENT DOCUMENTS

| | | |
|---|---|---|
| 2,554,442 | 5/1951 | Ehret ........................... 49/141 |
| 2,572,764 | 10/1951 | Roger et al. ................. 52/202 |
| 2,658,702 | 11/1953 | Osborne ....................... 182/189 |
| 2,965,193 | 12/1960 | Murphy ........................ 182/189 |
| 3,120,032 | 2/1964 | Burnette ....................... 52/1 X |
| 3,259,207 | 7/1966 | Schoeffler .................... 182/161 |
| 3,431,677 | 3/1969 | Ehret et al. .................. 49/141 |
| 3,477,543 | 11/1969 | Vigluicci ....................... 182/189 |
| 3,913,265 | 10/1975 | Ehret et al. .................. 49/141 |
| 4,106,236 | 8/1978 | Oliphant ....................... 49/141 |
| 4,164,095 | 8/1979 | Masacchia ..................... 52/1 |
| 4,237,654 | 12/1980 | Landem et al. ................ 49/141 |
| 4,257,193 | 3/1981 | Williams ....................... 49/465 |
| 4,263,760 | 4/1981 | Gell .............................. 52/204 |
| 4,445,589 | 5/1984 | Longenecker .................. 182/76 |

FOREIGN PATENT DOCUMENTS 1598036  9/1981  United Kingdom ............... 52/69

*Primary Examiner*—William F. Pate, III
*Assistant Examiner*—Andrew Joseph Rudy
*Attorney, Agent, or Firm*—Polster, Polster and Lucchesi

[57] ABSTRACT

An emergency exit structure for a personnel housing chamber including an exit opening sized and positioned relative the floor of the chamber to permit personnel to exit from the chamber in a crawling position on the floor of the chamber in the event of an emergency, a door assembly, including a releasably locked door panel covering the exit opening when not in emergency use.

2 Claims, 7 Drawing Figures

EMERGENCY EXIT FOR A PERSONNEL CHAMBER

BACKGROUND OF THE INVENTION

The present invention relates to personnel chambers and more particularly to an emergency exit for personnel chambers such as associated with mobile homes and contaminant protection chambers.

Emergency escape exits for personnel located in the side walls of housing chambers have been generally well known in the art. For the most part these exits have been positioned at window level or above, including doorways, have required considerable space in the side walls of the chambers, have been visually unaesthetic, and have been comparatively complex and expensive in construction, operation and maintenance. Further, a number of these exits have failed to consider the problems inherent in emergencies, such as fire with concomitant smoke and contaminant gases, and have located such exits in areas where smoke is likely to present serious inhalation problems. In fact, in some cases, the emergency exits, themselves, serve to provide natural barriers, concentrating smoke and contaminant gases around escaping personnel when in use.

Some of the earlier emergency exit devices which have employed either doorways or windows and which have included collapsible stairways or poles can be seen in U.S. Pat. No. 2,658,702, issued to W. W. Osborne on Nov. 10, 1953; U.S. Pat. No. 2,965,193, issued to R. J. Murphy on Dec. 20, 1960; and U.S. Pat. No. 3,259,207, issued to W. A. Schoeffler on July 5, 1966. Later issued U.S. Pat. No. 3,477,543 issued to K. J. Vigluicci on Nov. 11, 1969; U.S. Pat. No. 4,237,654, issued to R. Landum et al, on Dec. 9, 1980; and U.S. Pat. No. 4,445,589, issued to B. A. Longenecker on May 1, 1984, also have failed to recognize problems inherent with smoke and certain contaminant gases, teaching comparatively complex and space consuming door or window emergency escape exits which are comparatively difficult and expensive to construct, install, operate and maintain.

The present invention recognizing the importance of location of emergency escape exits due to smoke and contaminant gases which might occur in mobile vehicles and contaminant protection chambers, provides emergency exit structure which encourages escaping personnel, when such emergencies arise, to crawl below the rising smoke and contaminant gases, which is readily operable, which requires only the space essential for passage therethrough, and which does not afford a concentration barrier for such smoke and gases. In addition, the present invention provides an escape structure which is straightforward, efficient and economical to manufacture, install, operate and maintain and which can be readily incorporated into walls of existing structure without materially changing structural strength, insulation capability or appearance of such side wall.

Various other features of the present invention will become obvious to one skilled in the art upon reading the disclosure set forth herein.

SUMMARY OF THE INVENTION

More particularly, the present invention provides, in combination with a lower wall portion of a personnel housing chamber, an emergency exit opening in the lower wall adjacent the interior floor of the chamber, the exit opening being sized and positioned relative the floor of the chamber to permit personnel to exit therethrough from a crawling position on the floor of the chamber in the event of an emergency; an exit door assembly including a moveable door panel covering the exit opening; and, an actuable locking member to hold the door panel of the door assembly in releasably closed position in the exit opening.

It is to be understood that various changes can be made by one skilled in the art in the shape, construction and operation of the several parts of the structure disclosed herein without departing from the scope or spirit of the present invention.

BRIEF DESCRIPTION OF THE DRAWINGS

Referring to the drawings which disclose one advantageous embodiment of the present invention.

DETAILED DESCRIPTION OF THE INVENTION

Figure 1:
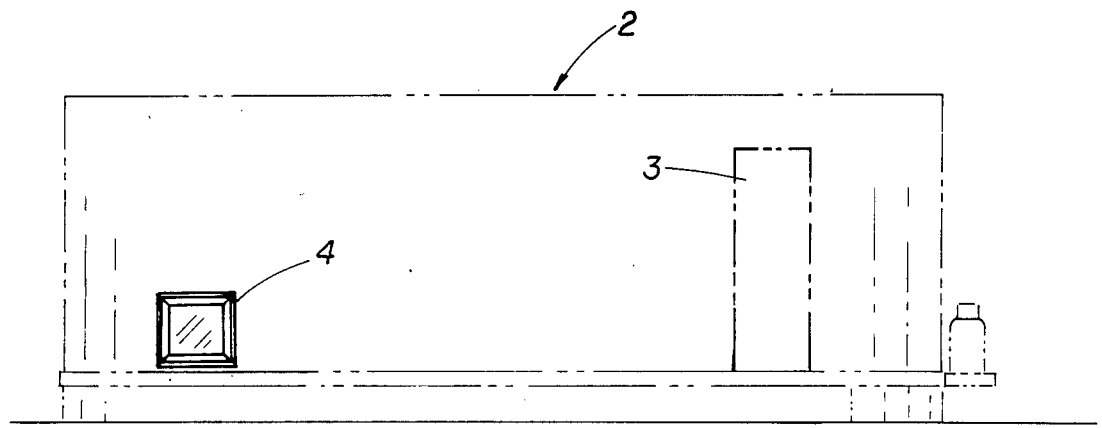
FIG. 1 is a side view of a mobile home shown in phantom and incorporating the inventive emergency exit.
Figure 2:
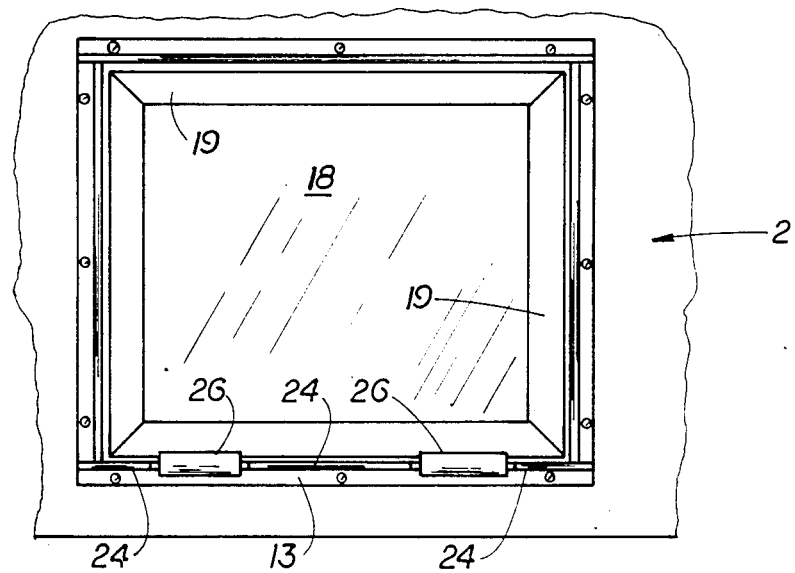
FIG. 2 is an enlarged side view of the emergency exit of FIG. 1, taken from the outer face of the side wall thereof.

Referring to FIG. 1 of the drawing a mobile home 2 is shown in phantom lines, having door 3 and the inventive emergency exit structure 4 disposed in the vertical side wall thereof. It is to be understood that the inventive emergency exit structure 4 described hereinafter can be utilized with various types of mobile homes and other personnel housing chambers, such as contaminant protection chambers to permit ready and safe exit from such chambers in the event of an emergency. In accordance with the invention, the exit structure 4 can be sized relative the width of door 3 and positioned relative the floor of mobile home 2 to permit personnel who have entered into the chamber to exit therefrom through the exit structure from a crawling position on the floor of mobile home 2 in the event of an emergency.

As can be seen in FIGS. 2 through 7 described hereinafter, the exit structure 4 in the vertical side wall of mobile home 2 includes a rectangular opening 6 (FIG. 6) having disposed therein a rectangular inner wall frame member 7 of right angle cross-section sized to conform with the periphery of the exit opening 6 with horizontal leg 8 extending into the opening to provide a border therefor and vertical leg 9 being fastened to the inner face of the vertical side wall of mobile housing 2 to surround the periphery of rectangular opening 6. As also can be readily seen in FIG. 6, opening 6 is positioned in the lower portion of the vertical side wall of mobile home 2 with the lower side thereof adjacent the floor 11 shown in phantom of home 2. Although the opening 6 is disclosed as being of generally rectangular shape it is to be understood that other geometric configurations can also be utilized, so long as they are sized and positioned relative the floor to permit personnel in the home to exit therethrough from a crawling position on the floor of the home or chamber in the event of an emergency.

Cooperating with rectangular inner wall frame member 7 is an appropriately sized and configured door assembly 12. Door assembly 12 includes outer wall rectangular frame member 13 of generally staggered, seat shaped, right angle cross-section having two oppositely extending vertical legs 14 and 16 and a connecting horizontal leg 17 nesting with the horizontal leg 8 of rectangular inner wall frame member 7. Vertical leg 14 is fastened by suitable screws to the outer face of the vertical side wall opposite vertical leg 9 fastened by suitable means to the side wall inner face. The other vertical leg 16, which is oppositely extending from horizontal leg 17 extends into opening 6 to provide a peripheral door panel seat.

Door assembly 12 further includes a door panel 18 hingedly fastened within rectangular outer wall member 13. Door panel 18 is comprised of a rectangular border frame 19 of H-shaped cross-section to nestingly receive the peripheral edges of the vertically extending, parallel, spaced inner and outer wall sheets 21 and 22 respectively, of the door assembly 12. A sheet 23 of suitable insulation material is disposed therebetween. It is to be understood that any one of several materials can be utilized for the door sheets 21, 22 and 23. Advantageously inner and outer wall sheets 21 and 22 can be of similar material as the walls of housing 2, such as light aluminum sheet metal. Rectangular border frame 19 can be formed from heavier aluminum ribs and insulation sheet 23 can be of glass fiber insulating material.

Figure 4:
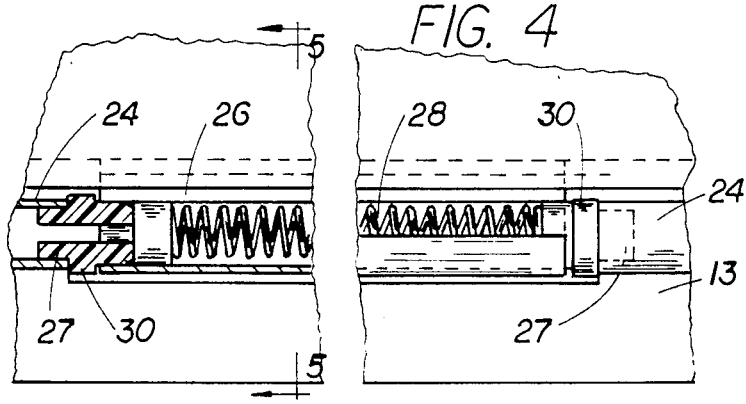
FIG. 4 is a partially broken away enlarged view of the butt hinge structure of the door assembly.
Figure 5:
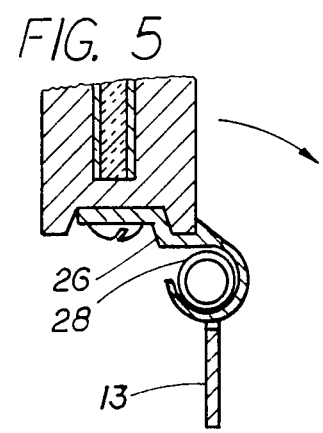
FIG. 5 is a cross-sectional view taken in a plane through line 5—5 of FIG. 4.
Figure 3:
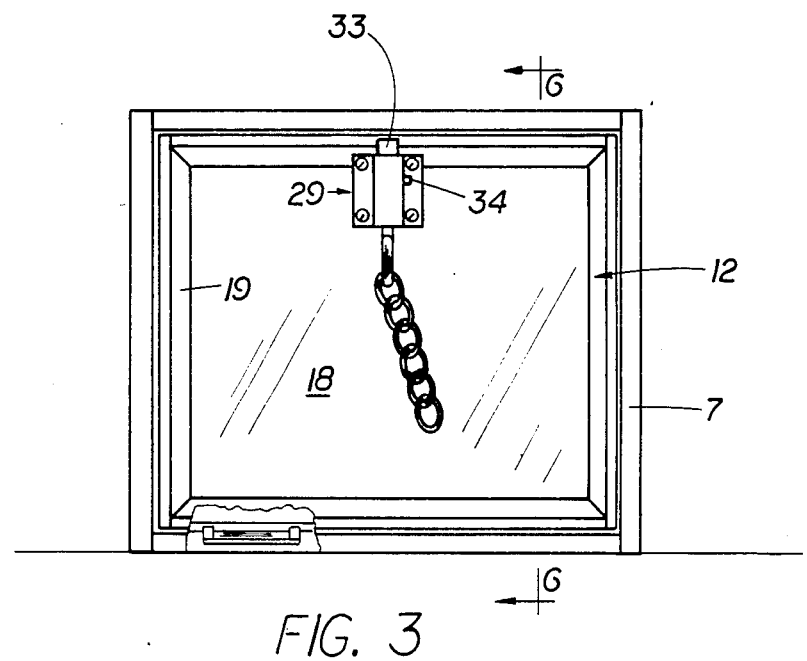
FIG. 3 is an enlarged side view of the emergency exit of FIGS. 1 and 2, taken from the inner face of the side wall thereof—a portion of the door assembly along the butt hinge being broken away.
Figure 7:
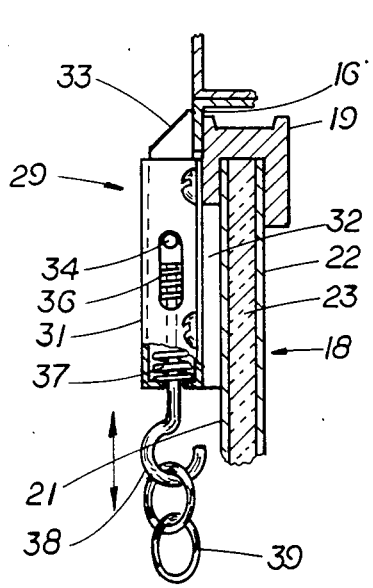
Figure 6:
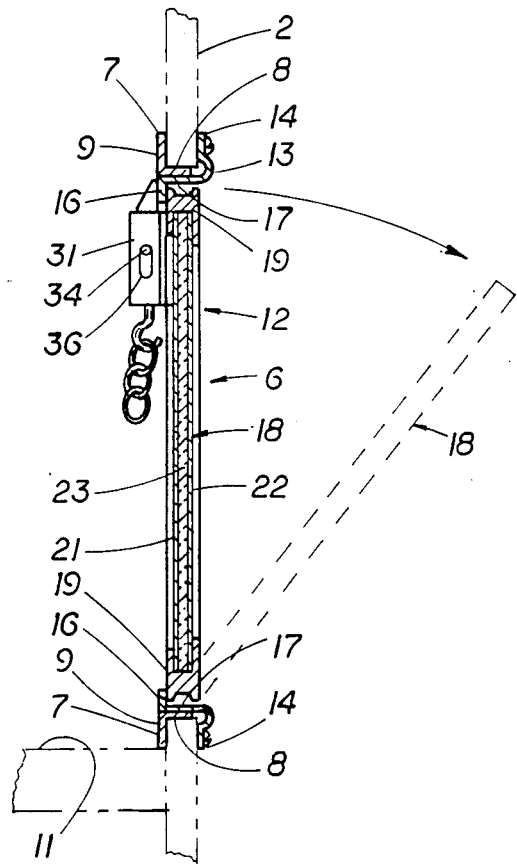
FIG. 6 is a side view of the emergency exit of FIG. 3 taken in plane through line 6—6 of FIG. 3, the phantom lines showing the door panel, moving toward open or escape position; and, FIG. 7 is a further enlarged, partially broken away side view of the hand actuable locking member mounted on the inner face of the door panel of FIGS. 3 and 6.

Referring to FIGS. 2, 3, 4 and 5 particularly, it can be seen that rectangular border frame 19 of door panel assembly 12 is provided with a butt hinge connection with the outer wall frame member 13 along the lower side thereof. This butt hinge connection includes dove tailing tubular segments 24 and 26 integral with the outer wall frame member 13 and the border frame 19 of door panel 18, respectively. As can be seen in FIG. 4, the dovetailing segments 24 and 26 are pivotally connected about their longitudinal axes by pin members 27 having outwardly flaring spacer ribs 30 with the pin extremities disposed within the dovetailing tubular segments to be urged into connecting engagement by longitudinally extending coiled springs 28 also disposed within the tubular segments 26. It is to be noted that this dovetailing hinge arrangement allows gravitational pivotal movement of the door panel 18 (FIG. 6) outside mobile home 2 when pushed out of closed position. Since the butt hinge is along the lowerside of door panel 18, the door panel does not provide a natural barrier for smoke and gases so as to envelope personnel exiting therethrough in an emergency.

To releasably hold the door panel 18 in closed position against the vertically extending leg 16 of rectangular outer wall frame member 13, a hand actuable locking member assembly 29 is provided. Locking member 29 is suitably fastened to the inner face of door panel 18 and includes a vertically extending bolt housing 31 fastened at its upper end to the upper side of rectangular border frame 19 of door panel 18 intermediate the ends thereof. The lower portion of bolt housing 31 is fastened to inner wall sheet 21 of door panel 18 through a shimmy block 32. Bolt member 33 is slidably mounted in housing 31, member 33 having a lateral retaining pin 34 mounted therein which engages in longitudinal slot 36 in the side of bolt housing 31 to allow limited slidable movement of bolt 33 within housing 31. Coiled spring 37 disposed in housing 31 below the lower end of bolt 33 serves to urge the bolt into locking position against leg 16. A pin 38 connected to the lower portion of bolt 33 permits hand actuable disengagement of bolt 33 from locked position against spring 37. If desired a suitable chain 39 can be fastened to pin 38 to facilitate reach and hand operation. With bolt 33 hand actuated from locked position, a gentle push on closed door panel 18 will cause it to pivot on its lower butt-hinge by gravity to open position to permit personnel in an emergency to crawl through opening 6 to safety.

It is to be understood that various lock arrangements can be used besides the one disclosed and, in fact, it would be possible to make an electronic connection between the lock and a smoke alarm to release and open the door panel 18 during a smoke emergency. It also is to be understood that, during non-emergency periods, opening 6 could be utilized as a lower vent for home 2, a suitable slide screen being provided to cover the opening when door panel 18 is in open position.

The invention claimed is:

1. In combination with a vertical peripheral wall of a mobile home having an interior horizontal floor and vertical peripheral side walls extending therefrom, said side walls having inner and outer faces and upper and lower portions, an exit opening in at least one of the lower portions of one of said vertical peripheral side walls adjacent said interior floor of said mobile home to permit exit from a crawling position, said exit opening being sized and positioned relative said interior floor of said mobile home to permit personnel to exit therethrough from a crawling position on the floor of said mobile home in an emergency; an inner wall frame member including joined vertical and horizontal leg members, said frame member being sized to conform with said exit opening with one of said leg members extending horizontally into said opening to provide a peripheral border therefor and the other of said leg members extending vertically to be fastened to said inner face of said vertical side wall; a door assembly including an outer wall frame member of spaced upper and lower horizontal leg members joined at their extremities by spaced vertical leg members, said leg members being generally staggered seat shaped right angle cross-section having two oppositely extending vertical leg portions joined by connecting intermediate leg portions which nest in one of the legs of said inner wall frame members, one of said outer wall vertical leg portions of said door assembly being fastened to said outer face of said vertical wall and the other oppositely extending vertical leg portion of said door assembly providing a door panel seat; said door assembly having a door panel comprised of a border frame including joined vertical and upper and lower horizontal legs nestingly receiving peripherhal edges of spaced inner and outer wall sheets with insulation material sandwiched therebetween, said border frame of said door panel having a butt hinge connecting with said outer wall frame member along the lower horizontal leg thereof, said hinge connection including dovetailing tubular segments integral with said outer wall frame member and said door panel respectively to form a butt hinge when dovetailed, said dovetail segments being pivotally connected about the longitudinal axis thereof by spring load pin members disposed within said integral tubular segments for gravitational pivotal movement of said door panel outside said mobile home when pushed out of closed position; and an actuable locking member including a bolt housing mounted on the inner wall sheet and upper horizontal leg of said border frame of said door panel on the upper side thereof and an arcuate spring loaded bolt slidably disposed within said housing to hold said door panel in closed position against said outer door frame, said bolt member being hand actuable by personnel when in the crawling position on the floor of said mobile home.

2. In combination with a vertical peripheral side wall of a mobile home having an interior horizontal floor and vertical peripheral side walls having inner and outer faces, extending therefrom including upper and lower portions, a rectangular exit opening in the lower portion of one of said vertical peripheral side walls adjacent said interior floor of said mobile home to permit exit from a crawling position, said exit opening being sized and positioned relative said interior floor of said mobile home to permit personnel to exit therethrough from a crawling position on the floor of said mobile home in an emergency; a rectangular inner wall frame member including joined vertical and horizontal leg members of right angle cross-section, said frame member being sized to conform with said exit opening with one of said leg members extending horizontally into said opening to provide a peripheral border therefor and the other of said leg members extending vertically to be fastened to said inner face of said vertical side wall; a door assembly including an outer wall rectangular frame member of spaced upper and lower horizontal leg members joined at their extremities by spaced vertical leg members, said leg members being of generally staggered seat shaped right angle cross-section having two oppositely extending vertical leg portions joined by connecting intermediate leg portions which nest with one of the legs of said inner wall frame member, one of said outer wall vertical leg portions of said door assembly being fastened to said outer face of said vertical wall and the other oppositely extending vertical leg portion of said door assembly providing a door panel seat; said door assembly having a rectangular door panel comprised of a rectangular border frame including joined vertical and upper and lower horizontal legs nestingly receiving peripheral edges of spaced inner and outer wall rectangular sheets with a rectangular sheet of glass fiber insulation material sandwiched therebetween; said rectangular border frame of said door panel having a butt hinge connection with said outer wall frame member along the lower horizontal leg thereof, said hinge connection including dovetailing tubular segments integral with said outer wall frame member and said door panel respectively to form a butt hinge when dovetailed, said dovetailed segments being pivotally connected about the longitudinal axes thereof by spring loaded pin members disposed within said integral tubular segments for gravitational pivotal movement of said door panel outside said mobile home when pushed out of closed position; and an actuable locking member including a bolt housing mounter on the inner wall sheet and upper horizontal leg of said border frame of said door panel on the upper side thereof and an actuable spring loaded bolt slidably disposed within said bolt housing to releasably hold said door panel in closed position against said outer door frame, said bolt member being hand actuable by personnel when in the crawling position on the floor of said mobile home.

* * * * *